Figure 3:
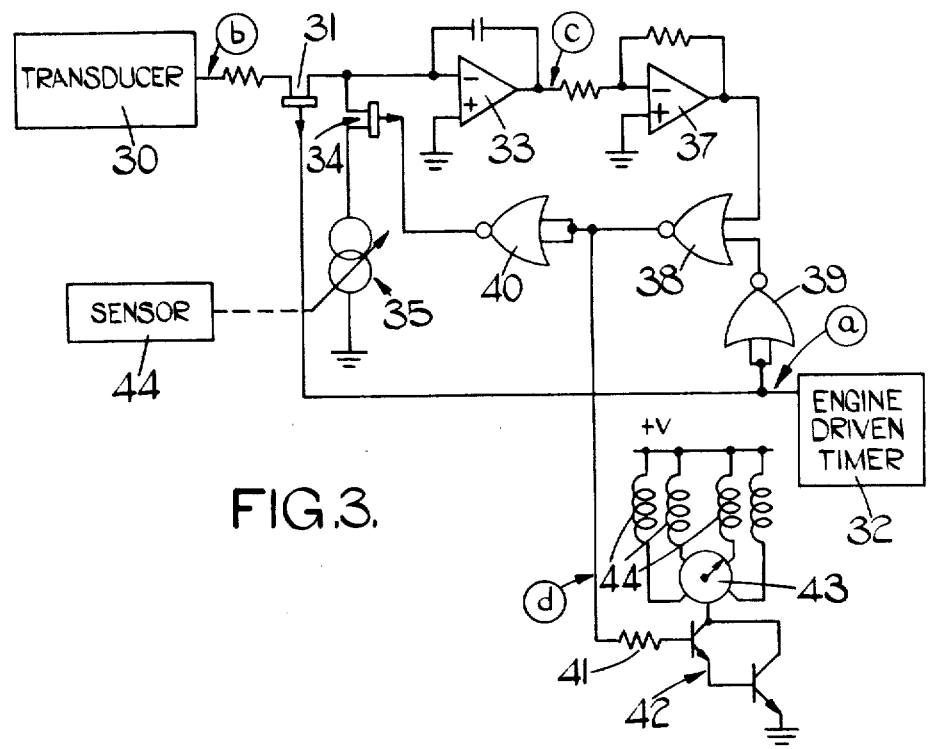

United States Patent [19]

Moore

[11] 4,052,964
[45] Oct. 11, 1977

[54] CORONA DISCHARGE FLUID FLOW TRANSDUCERS AND FUEL INJECTION SYSTEMS INCORPORATING SUCH TRANSDUCERS

[75] Inventor: John Howard Moore, Redditch, England

[73] Assignee: The Lucas Electrical Company Limited, Birmingham, England

[21] Appl. No.: 655,656

[22] Filed: Feb. 5, 1976

[30] Foreign Application Priority Data

Feb. 12, 1975 United Kingdom .................. 5884/75

[51] Int. Cl.² ................. F02B 3/00; F02B 33/00
[52] U.S. Cl. ................. 123/32 EJ; 123/32 ED; 73/194 F
[58] Field of Search ............... 73/194 F; 123/32 EA, 123/32 EJ

[56] References Cited

U.S. PATENT DOCUMENTS

3,732,854  5/1973  Murtin ..................... 123/32 EA
3,831,445  8/1974  Durbin ..................... 73/194 F

FOREIGN PATENT DOCUMENTS

2,218,458  3/1973  Germany .................. 73/194 F

*Primary Examiner*—Ronald B. Cox
*Attorney, Agent, or Firm*—Ladas, Parry, Von Gehr, Goldsmith & Deschamps

[57] ABSTRACT

A corona discharge gas flow transducer includes a high tension discharge electrode, and a receiving electrode having two terminals, the difference between the current flow from these terminals representing the gas mass flow. For deriving a current difference signal there is a circuit comprising a current to voltage converter, switch means alternately connecting the two terminals to the converter, and further switch means a.c. coupled to the converter and operable in synchronism with the switch means.

The transducer is used in an i.c. engine fuel system in which the transducer output is integrated over a fixed engine crankshaft angle to generate a fuel demand signal.

7 Claims, 4 Drawing Figures

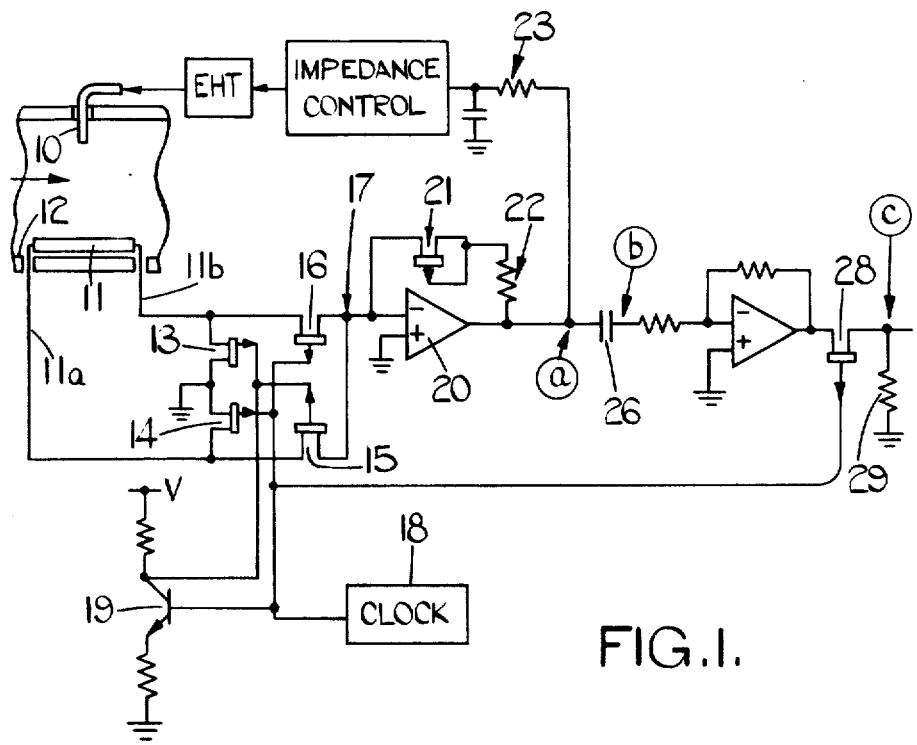
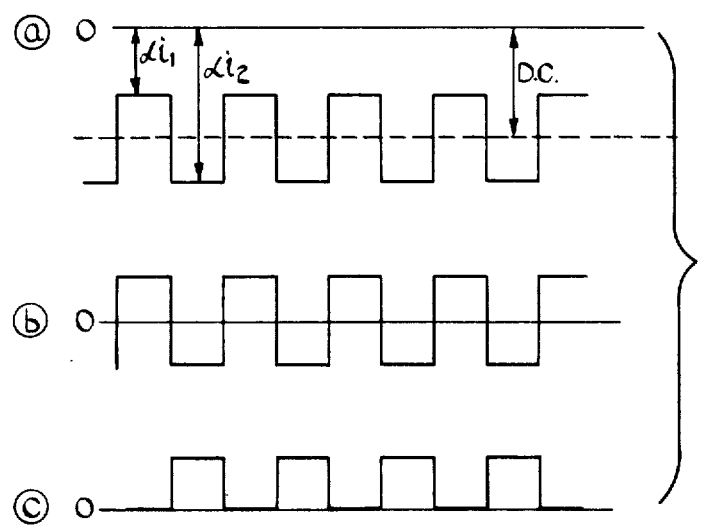
FIG.1.
FIG.2.

CORONA DISCHARGE FLUID FLOW TRANSDUCERS AND FUEL INJECTION SYSTEMS INCORPORATING SUCH TRANSDUCERS

This invention relates to fluid flow transducers and internal combustion engine systems incorporating such transducers.

It has already been proposed to measure the rate of flow of a fluid stream by causing the fluid stream to pass between two electrodes between which a voltage is maintained to cause a corona discharge to pass through the flowing fluid. One electrode is divided so that the proportion of the discharge current collected by the two parts of this electrode will vary in accordance with the fluid flow and, in fact, with the device correctly set up the difference between the two currents will be proportional to the fluid flow.

At very low fluid flows, however, the current difference is very small in practice and becomes extremely difficult to measure with conventional circuits because of problems of input offset and bias currents and input offset voltages.

Accordingly it is an object of the invention to provide a corona discharge type fluid flow transducer with a convenient form of current difference measuring circuit which overcomes these problems.

In accordance with the invention a corona discharge type fluid flow transducer comprises first and second electrodes between which the fluid flow to be measured is passed and between which a corona discharge current through the fluid is maintained, in use, the second electrode having two terminals and the difference between the current drawn from said terminals being representative of the fluid flow between the electrodes, in combination with a current difference measurement circuit including a current-to-voltage converter, cyclically operable switch means for alternately connecting the two terminals of the second electode to the current-to-voltage converter, and further switch means a.c. coupled to the current-to-voltage converter and operable in synchronism with said switch means to produce an output signal having a d.c. component related to the magnitude and sign of the difference between the voltage at the output of the current-to-voltage converter when the one terminal of the second electrode is connected to the input of the current-to-voltage converter and the voltage when the other terminal is so connected.

The switch means and the further switch means are preferably in the form of FET switch circuits operable by a common clock which runs at a frequency in excess of the maximum expected frequency of fluctuation of the fluid flow.

The arrangement described above also has the advantage of providing a convenient control signal for controlling the voltage applied to the electrodes to maintain the discharge current constant, or alternatively to maintain the ratio of voltage to current constant. In this connection it will be appreciated that the output of the current-to-voltage converter will include a d.c. component upon which the a.c. signal passed to said further switch means is superimposed. This d.c. component is of magnitude related to the total current passing from both terminals of the second electrode.

Thus, in accordance with a further feature of the invention, the output of the current-to-voltage converter is also connected to a low-pass filter (to remove the a.c. signal) and the output of the filter is used to control the total current flowing between the electrodes and/or the voltage applied to them.

It is another object of the invention to provide an internal combustion engine fuel injection control system in an improved form.

An internal combustion engine fuel injection system in accordance with the invention comprises a transducer as defined above together with an injection control circuit controlled by the output of the further switch means for regulating the rate at which fuel is injected into the engine.

Preferably the injection control circuit includes an integrator to which the output of said further switch means is periodically applied for a period corresponding to a fixed engine crankshaft angle. The ouput of the integrator at the end of said period is then proportional to the total mass of air aspirated during that period (allowing for a humidity correction).

The injection control circuit preferably also includes a constant current source through which the integrator is discharged periodically, the length of time taken for such discharge determining the quantity of fuel to be injected. The constant current source may be variable in accordance with the humidity of the air or with the concentration of pollutants in the engine exhaust gas.

Figure 4:
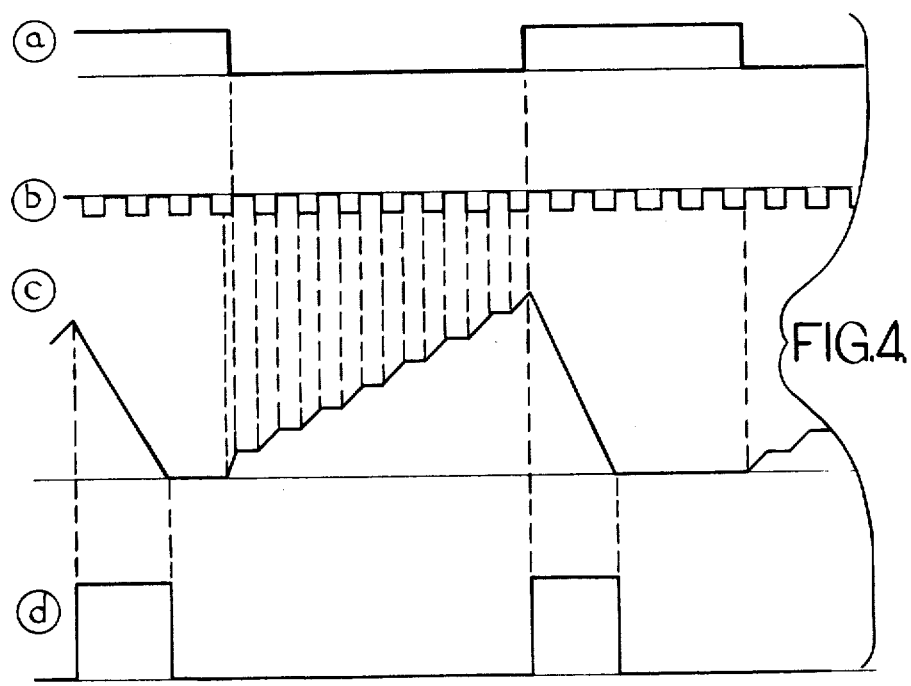

In the accompanying drawings:

FIG. 1 is a circuit diagram of an example of a transducer in accordance with the invention, FIG. 2 is a graph showing waveforms at various parts of the circuit of FIG. 1, FIG. 3 is a circuit diagram of an example of a fuel injection system in accordance with the invention, and FIG. 4 is a graph showing waveforms at various parts of the circuit of FIG. 3.

Referring firstly in FIG. 1 the transducer is of the known kind including a high voltage electrode 10 and a discharge receiving electrode 11. The electrode may be in two separate parts spaced along a conduit 12, but in this case is preferably a resistive film with terminals 11a, 11b at opposite ends axially spaced along the conduit 12. The electrode 10 is arranged symmetrically with respect to the electrode 11 so that in either case, when there is no flow along the conduit 12, the corona discharge established between the electrode is symmetrical. Thus, in the case where the receiving electrode is in two parts, the two parts receive equal currents, or, where the electrode is a resistive film, the impedances of the current paths to the two terminals are equal and equal currents can flow from the two terminals. When fluid flows along the conduit the discharge is displaced and an increased proportion of the discharge current flows from the terminal which is downstream. The difference between the currents is proportional to the mass flow of the fluid, although there is also some dependence on the relative humidity when the fluid is air.

The terminals 11a, 11b are connected to cyclically operable switch means illustrated diagrammatically as two shunt/series FET switches with all bias components omitted for clarity. Thus a pair of shunt FET switches 13, 14 have their drain/source paths connected between the terminals 11b, 11a and earth and a pair of series FET switches 15, 16 have their drain/source paths connected between the terminals 11a and 11b and a common output terminal 17. The gates of the FET's 14 and 16 are connected together and to the output terminal of a clock pulse generator 18. The gates of the FET's 13 and 15 are connected together and to a phase inverter circuit 19 driven by the clock pulse generator 18. Thus, when the FET's 13 and 15 are conducting the FET's 14 and 16 are not and vice versa.

The terminal 17 is connected to the invert input terminal of an operational amplifier 20 connected as a current-to-voltage converter with a diode connected FET 21 and a resistor 22 in series in its feedback path.

The output of the operational amplifier 20 is shown in FIG. 2a. The waveform shown has a negative d.c. component and a rectangular wave a.c. component of amplitude smaller than the d.c. component. Thus, the output has two negative d.c. levels proportional to the current drawn from the two terminals 11a and 11b respectively.

For controlling the total current of the corona discharge, the output terminal of the amplifier 20 is connected to an R-C filter 23 which removes (or at least substantially attenuates) the a.c. component referred to. The output of the filter 23 is applied to an impedance control 24 of an e.h.t. generator 25 connected to the electrode 10. The impedance control circuit varies the impedance of the generator 25 to maintain a controlled discharge current.

The output terminal of the amplifier 20 is also a.c. coupled by a capacitor 26 to a further switch means constituted by an operational amplifier 27 connected as an inverting buffer and a further FET series switch 28 (again shown with its bias components omitted). The gate of the FET 28 is connected to the output terminal of the clock 18 so that the FET 28 is conductive at the same time as the FET 16.

FIG. 2b shows the waveform at the output side of the coupling capacitor 26 and it will be observed that this is exactly the same as the waveform of FIG. 2a, but has no d.c. component. FIG. 2c shows the waveform at the output terminal of the FET switch 28 (i.e. across the load resistor 29). The waveform has been inverted and the negative-going half-cycles removed. The height of the positive-going half-cycles is proportional to the difference between the currents drawn from the terminals 11a and 11b. The above situation arises when the current drawn from terminal 11b exceeds that drawn from terminal 11a. When the current drawn from terminal 11b is the lesser, only the negative-going half-cycles of the a.c. signal will appear at the output of the FET switch 28.

Thus the output of the switch 28 has a d.c. component, the magnitude and polarity of which depend on the magnitude and sign of the difference between the currents drawn from the terminals 11b, 11b.

Turning now to FIG. 3, the circuit shown includes a transducer 30 according to FIG. 1 which has its electrodes mounted in the air intake manifold of an internal combustion engine. The output terminal of the transducer is connected to an FET series switch 31 which has its gate terminal connected to an engine driven timer pulse generator 32. As in FIG. 1 the bias components of the switch 31 are omitted for clarity. The output terminal of the switch 31 is connected to the invert input terminal of an operational amplifier 33 connected as an integrator and also to a FET shunt switch 34 which shunts the invert input terminal of the operational amplifier 33 to earth via an adjustable constant current source 35.

As shown in FIG. 4, the generator 32 produces pulses which operate the switch 31. When the switch 31 is conductive the pulses from the transducer 30 pass to the integrator operational amplifier 33 so that the output voltage builds up to a level dependent on the magnitude of the d.c. level of these pulses and the length of time for which the switch 31 is conductive. The final output voltage is proportional to the mass of air aspirated during this length of time (which corresponds to a fixed angle of rotation of the engine crankshaft). Note that if there is a reversal of flow in the intake manifold at any time during the integrating period, the pulses from the transducer 30 will be negative-going and the integral will be appropriately reduced.

With the switch 31 non-conductive and the switch 34 conductive a constant current (dependent on the adjustment of the source 35) will be fed to the integrator input and its output will thus reduce at a constant ramp rate (likewise dependent on the adjustment of the source 35).

The output terminal of the integrator operational amplifier is connected via a resistor 36 to the invert input terminal of an operational amplifier 37, connected to operate as a high gain inverting amplifier.

The output terminal of the amplifier 37 is connected to one input terminal of a NOR gate 38 the other input terminal of which is connected to the output terminal of a NOR gate 39 which has both its input terminals connected to the generator 32. The output terminal of the gate 38 is connected to both input terminals of a NOR gate 40 the output terminal of which is connected to the gate of the FET switch 34. The output terminal of the gate 38 is also connected via a resistor 41 to the base of a Darlington pair 42 the emitter of which is grounded and the collector of which is connected via a distributor 43 to the injector solenoid 44.

At the end of a pulse from the generator 32, the switch 31 becomes conductive and switch 34 is non-conductive so that the integrator 37 integrates the incoming pulses from the transducer 30 until the commencement of the next pulse from the generator 32. The output of the integrator is detected by the amplifier 37 and prevents gate 38 from producing an output. Thus, when the next pulse from the generator 32 starts the gate 39 will product an output which switches on the Darlington pair 42 to energise whichever of the solenoids 44 is connected thereto by the distributor 43. Simultaneously, the switch 31 will become non-conductive and the switch 34 will become conductive. When the output of the integrator 33 becomes negative the gate 38 will produce an output blocking gate 39 and thereby switching off the Darlington pair 42 and the switch 34. The circuit now remains quiescent until the end of the pulse from the generator 32 when the cycle described recommences.

The current source 35 may be adjustable by a sensor 45 which detects some independent engine parameter. Since the transducer described suffers from some variation of its output with varying humidity, the sensing may be a humidity sensor arranged to cancel out this variation. Alternatively, since the overall object of the invention is to reduce noxious exhaust emissions, the sensor may be placed in the exhaust system of the invention and be designed to detect the oxygen content or the carbon monoxide content, thereby forming a closed loop emission control.

I claim:

1. A corona discharge type fluid flow transducer comprising first and second electrodes between which the fluid flow to be measured is passed and between which a corona discharge current through the fluid is maintained, in use, the second electrode having two terminals and the difference between the current drawn from said terminals being representative of the fluid flow between the electrodes, in combination with a current difference measurement circuit including a current-to-voltage converter, cyclically operable switch means for alternatively connecting the two terminals of the second electrode to the current-to-voltage converter, and further switch means a.c. coupled to the current-to-voltage converter and operable in synchronism with said switch means to produce an output signal having a d.c. component related to the magnitude and sign of the difference between the voltage at the input of the current-to-voltage converter when the one terminal of the second electrode is connected to the input of the current-to-voltage converter and the voltage when the other terminal is so connected.

2. A transducer as claimed in claim 1 in which said switch means and said further switch means are in the form of F.E.T. switch circuits operable by a common clock running at a frequency in excess of the maximum expected frequency of fluctuations in the fluid flow.

3. A transducer as claimed in claim 1 further including a means controlling the discharge current having an input terminal to which a control signal is applied to control the discharge current, and a low-pass filter connecting the output of the current-to-voltage converter to said input terminal.

4. An internal combustion engine fuel injection system comprising in combination:
   a corona discharge type fluid flow transducer comprising first and second electrodes between which the fluid flow to be measured is passed and between which a corona discharge current through the fluid is maintained, in use, the second electrode having two terminals and the difference between the current drawn from said terminals being representative of the fluid flow between the electrodes;
   a current difference measurement circuit including a current-to-voltage converter, cyclically operable switch means for alternately connecting the two terminals of the second electrode to the current-to-voltage converter, and further switch means a.c. coupled to the current-to-voltage converter and operable in synchronism with said switch means to produce an output signal having a d.c. component related to the magnitude and sign of the difference between the voltage at the output of the current-to-voltage converter when the one terminal of the second electrode is connected to the output of the current-to-voltage converter and the voltage when the other terminal is so connected; and
   an injection control circuit controlled by the output of said further switch means for regulating the rate at which fuel is injected into the engine.

5. A system as claimed in claim 4 in which the injection control circuit comprises an integrator means for periodically applying the output of the second switch means of the transducer to said integrator for a period corresponding to a fixed engine crankshaft rotation angle, so as to accumulate in said integrator a signal corresponding to the total mass of air aspirated in said period.

6. A system as claimed in claim 5 including a controlled current source through which the integrator is discharged periodically, and means operable by the integrator during discharge thereof to determine the quantity of fuel injected.

7. A system as claimed in claim 6 in which said current source is variable in accordance with at least one engine parameter.

* * * * *